United States Patent
Akiyama

(10) Patent No.: US 9,064,018 B2
(45) Date of Patent: Jun. 23, 2015

(54) INFORMATION PROVIDING SYSTEM THAT PROVIDES INFORMATION BASED ON STRENGHTH OF DESIRE AND CURRENT SITUATION

(75) Inventor: Takayuki Akiyama, Kokubunji (JP)

(73) Assignee: Hitachi Solutions, Ltd., Tokyo (JP)

( * ) Notice: Subject to any disclaimer, the term of this patent is extended or adjusted under 35 U.S.C. 154(b) by 200 days.

(21) Appl. No.: 13/489,506

(22) Filed: Jun. 6, 2012

(65) Prior Publication Data

US 2012/0317106 A1   Dec. 13, 2012

(30) Foreign Application Priority Data

Jun. 8, 2011  (JP) .................................. 2011-128572

(51) Int. Cl.
G06F 17/30 (2006.01)

(52) U.S. Cl.
CPC .... *G06F 17/30867* (2013.01); *G06F 17/30997* (2013.01)

(58) Field of Classification Search
CPC .......... G06Q 30/0254; G06Q 30/0255; G06Q 30/0269; H04N 21/44222; H04N 21/4668; H04N 21/4667; G06F 17/30997; G06F 17/30867
See application file for complete search history.

(56) References Cited

U.S. PATENT DOCUMENTS

| | | | |
|---|---|---|---|
| 6,418,424 B1* | 7/2002 | Hoffberg et al. | 706/21 |
| 2008/0319855 A1* | 12/2008 | Stivoric et al. | 705/14 |
| 2011/0313864 A1* | 12/2011 | Eldering et al. | 705/14.66 |
| 2012/0036449 A1* | 2/2012 | Minnis et al. | 715/745 |
| 2012/0066072 A1* | 3/2012 | Kanigsberg et al. | 705/14.66 |
| 2012/0130813 A1* | 5/2012 | Hicken et al. | 705/14.54 |
| 2012/0158503 A1* | 6/2012 | Mardikar | 705/14.53 |
| 2013/0054366 A1* | 2/2013 | Roundtree et al. | 705/14.55 |

FOREIGN PATENT DOCUMENTS

JP    2009-129298 A    6/2009

OTHER PUBLICATIONS

Nelson, Phillip, "Information and Consumer Behavior", Journal of Political Economy, vol. 78, pp. 311-329, 1970 (nineteen (19) sheets).
Reiss, Steven, "Who am I? The 16 Basic Desires that Motivate Our Actions and Define Our Personalities", Berkley Trade, pp. 17-34, 2002 (twenty (20) pages).

* cited by examiner

*Primary Examiner* — Leslie Wong
(74) *Attorney, Agent, or Firm* — Crowell & Moring LLP

(57) ABSTRACT

An internal state of a user and a situation of the user are complementarily used to recommend optimal information for the individual user. An information providing system according to the present invention estimates a current strength of a desire of the user and a current situation of the user to refer to a database describing combinations of the strength and the situation to thereby present items that can satisfy both the desire of the user and the situation of the user.

15 Claims, 13 Drawing Sheets

Fig. 4A

| Context ID | Satisfiability of desire ID 1 | ... | Satisfiability of desire ID 19 |
|---|---|---|---|
| ID_C1 | Pr(desire1\|ID_C1) | ... | Pr(desire19\|ID_C1) |
| ID_C2 | Pr(desire1\|ID_C2) | ... | Pr(desire19\|ID_C2) |
| ID_C3 | Pr(desire1\|ID_C3) | ... | Pr(desire19\|ID_C3) |
| ID_C4 | Pr(desire1\|ID_C4) | ... | Pr(desire19\|ID_C4) |
| ... | ... | ... | ... |

| Context ID | Detail | Determination condition |
|---|---|---|
| ID_C1 | Spring | Temperature, date |
| ID_C2 | Summer | ... |
| ID_C3 | Fall | ... |
| ID_C4 | Winter | ... |
| ID_C5 | At lunch | 11:00-13:00 |
| ... | ... | ... |

(1051, 1053, 1054)

INFORMATION PROVIDING SYSTEM THAT PROVIDES INFORMATION BASED ON STRENGHTH OF DESIRE AND CURRENT SITUATION

CLAIM OF PRIORITY

The present application claims priority from Japanese patent application JP 2011-128572 filed on Jun. 8, 2011, the content of which is hereby incorporated by reference into this application.

BACKGROUND OF THE INVENTION

1. Field of the Invention

The present invention relates to an apparatus that presents information suitable for a current situation of a user.

2. Background Art

An amount of information provided by various media, such as the Internet, is overwhelming due to the development of information communication techniques and the proliferation of commercial uses of the techniques. The user can receive various pieces of information, and the utility of the information for the user is diversified. Therefore, it is difficult for the user to select useful information for the user from a large amount of various pieces of information. Advantages of advertising to an unspecified number of individuals are decreasing for information providers.

Under the circumstances, recently known techniques include a technique of recommending useful information suitable for a profile of the user by extracting and analyzing the profile such as preference information (what kind of information the user is interested in) of the user from a consumer behavior history of the user and a data mining technique for using the information as marketing data in targeting advertising.

Nelson, P.: "Information and Consumer Behavior", Journal of Political Economy, Vol. 78, pp. 311-329, (1970) suggests that an object of a consumer behavior of a human being is to satisfy a desire. The existence of basic desires of a human being is known as shown in Steven Reiss: "Who am I? The 16 Basic Desires that Motivate Our Actions and Define Our Personalities", Berkley Trade (2002). Desire strengths in consumer behaviors of the user can be expressed by constant strengths of desires that are universal in a long term and momentary strengths of desires (hereinafter, "current desires").

Meanwhile, it is known that the consumer behaviors of a human being are caused by internal factors and external factors (Nelson, P.: "Information and Consumer Behavior", Journal of Political Economy, Vol. 78, pp. 311-329, (1970)). The internal factors are caused by changes in the state of the body, and the internal factors denote physical desires, such as hunger, thirst, sleepiness, and sexual urge, as well as psychological desires, such as social prestige, status, friendship, and power. The external factors are caused by changes in the external environment, and the external factors denote factors affected by external situations, such as an activity area, a time zone/season, and conversation with a friend. The situation of the user caused by the external factors will be called a context in the present specification.

An example of a technique of extracting the internal factors includes a method of expressing the internal state of the user by satisfaction levels of basic desires. Examples of the basic desires include "possession", "intellectual curiosity", "peace of mind", and "social belonging".

The "possession" is a desire related to acquisition and possession, such as collection of goods and possession of special things. The "intellectual curiosity" is a desire related to curiosity to knowledge, such as interest in unknown things and learning unknown matters. The "peace of mind" is a desire related to calmness of mind, such as healing, release from stress, and prevention of shame. The "social belonging" is a desire related to a sense of belonging to society, such as protection of regions or society and doing right things on a global scale.

The desire of "possession" emerges in actions, such as collection of stamps, recording of series TV programs, a bonus gift of drinking water, and local gourmet. The desire of "intellectual curiosity" emerges in actions, such as watching an educational program, purchasing a book related to trivia, and a historic site tour. The desire of "peace of mind" emerges in actions, such as viewing programs of classic concerts, purchase of commodities related to aromatherapy, and a hot spring trip. The desire of "social belonging" emerges in actions, such as watching sports programs in which countries are represented as in the Olympics and purchase of commodities with small environmental load.

An example of a technique taking the external factors into account includes a method of recommending items corresponding to the context (JP Patent Publication (Kokai) No. 2009-129298 A). The items here denote, for example, various pieces of information, such as commodity information, TV program information, book information, and sightseeing spot information, selected by the user according to the interest and preference of the user.

In the method described in JP Patent Publication (Kokai) No. 2009-129298 A, area location information and a time zone are set in advance according to the context of the user. The method determines that the user is in the state of the context when the user is in the area or in the time zone and recommends items suitable for the context. To register an optimal item for the context, a highly frequently selected item in the context is registered as the optimal item based on an item selection history of the user and based on the contexts in the history.

SUMMARY OF THE INVENTION

In the technique of recommending the items based on the satisfaction levels of the basic desires that are the internal state of the user, the context of the user is not taken into account. Therefore, the items satisfying the desires may not be suitable for the context. For example, if a sandwich satisfies hunger in the morning, but a steak is optimal for satisfying hunger at night, the recommendation of a sandwich as an item that satisfies hunger cannot satisfy the desire of hunger at night.

The desire that can be satisfied by an item changes if the context of the user changes. Therefore, it is difficult to highly accurately estimate the satisfaction level of the desire based on the action history of the user. For example, swimming in the sea in the summer is often for amusement, and the swimming satisfies a desire such as "peace of mind". Swimming in the winter is often for training, and the swimming satisfies a desire such as "improvement and accomplishment". It is not hard to imagine such a situation.

The internal state of the user is not taken into account in the technique of estimating the context to recommend items as in JP Patent Publication (Kokai) No. 2009-129298 A. Therefore, an item not desired by the user may be recommended. For example, a restaurant may be recommended as the user approaches the restaurant at lunch time, although the user has just finished eating a late breakfast.

As examined, the user simultaneously considers the context of the internal state of the user and the external environment to select an item. Therefore, a method of complementarily using the desire of the user and the context of the user to recommend an item is needed.

The present invention has been made in view of the foregoing circumstances, and an object of the present invention is to complementarily use the internal state of the user and the situation of the user to recommend information optimal for an individual user.

An information providing system according to the present invention estimates a current strength of a desire of a user and a current situation of the user and refers to a database describing combinations of the strength and the situation to thereby present an item that can satisfy both the desire of the user and the situation of the user.

According to the information providing system of the present invention, an item suitable for both the current desire of the user and the current situation of the user can be presented.

BRIEF DESCRIPTION OF THE DRAWINGS

FIGS. 4A and 4B are diagrams showing examples of configuration of data stored in a context-desire combination probability database 105.

DETAILED DESCRIPTION OF THE PREFERRED EMBODIMENTS

First Embodiment

Figure 1:
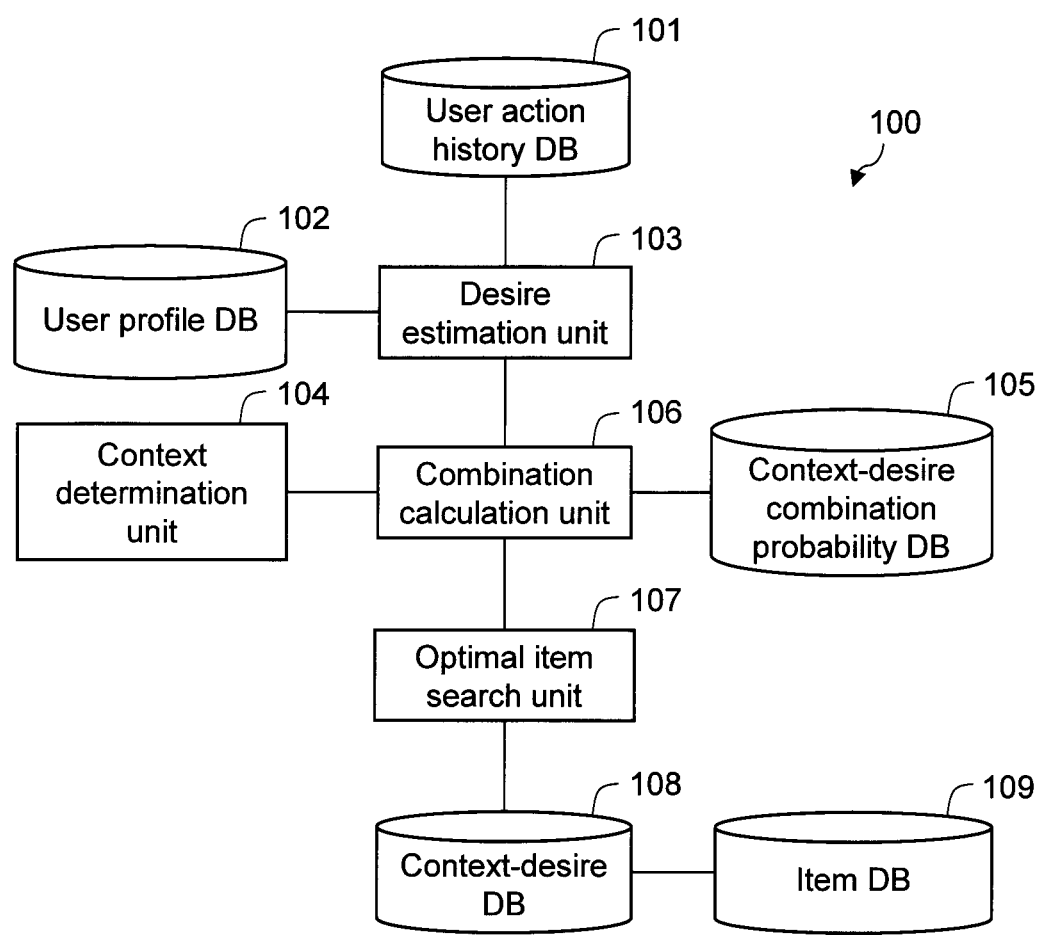
FIG. 1 is a functional block diagram of an information providing system 100 according to a first embodiment.

FIG. 1 is a functional block diagram of an information providing system 100 according to a first embodiment of the present invention. The information providing system 100 includes a user action history database 101, a user profile database 102, a desire estimation unit 103, a context determination unit 104, a context-desire combination probability database 105, a combination calculation unit 106, an optimal item search unit 107, a context-desire database 108, and an item database 109.

The user action history database 101 stores a history of actions of selection of items, such as commodities, by a user. The user profile database 102 stores desire profiles describing constant strengths of desires of the user, for each type of the desires. The desire estimation unit 103 refers to the user action history database 101 and the user profile database 102 to estimate the current strength of the desire of the user. The context determination unit 104 determines the current situation (context) of the user. The context-desire combination probability database 105 stores information describing probabilities of satisfying the desires under the context of the user, for each combination of the context and the desire. The combination calculation unit 106 calculates a combination of the item, the context, and the desire that can satisfy both the current desire of the user and the context of the user. The optimal item search unit 107 searches the item calculated by the combination calculation unit 106 from the context-desire database 108. The context-desire database 108 stores information describing combinations of the desire and the context that can be satisfied by each item. The item database 109 stores attribute information of the items.

The combination calculation unit 106 and the optimal item search unit 107 may be integrally formed. For example, the user may input the context of the user, or the context may be determined based on the surrounding environment, such as present time, date/time, temperature, and humidity.

Figure 2:
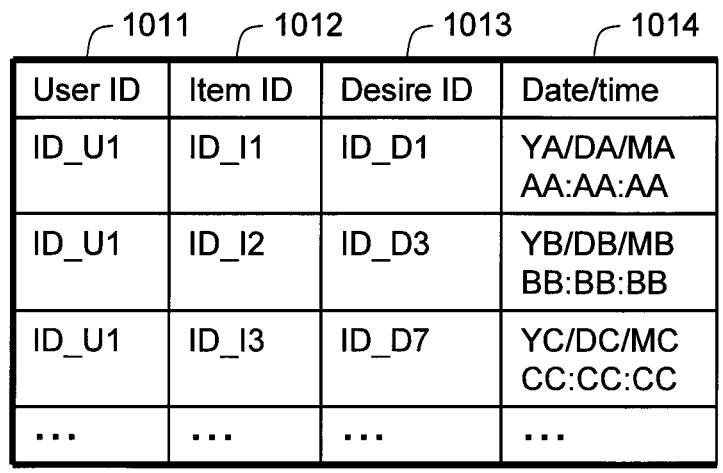
FIG. 2 is a diagram showing an example of configuration of data stored in a user action history database 101.

FIG. 2 is a diagram showing an example of configuration of data stored in the user action history database 101. The user action history database 101 is a database that stores a history of selection of items by the user. The user action history database 101 includes a user ID field 1011, an item ID field 1012, a desire ID field 1013, and a date/time field 1014.

The user ID field 1011 holds identifiers for uniquely identifying the users. The item ID field 1012 holds identifiers for uniquely identifying the items. The desire ID field 1013 holds values indicating types of basic desires satisfied by selecting the items identified by the values of the item ID field 1012. The date/time field 1014 holds date and time of selection of the items identified by the values of the item ID field 1012, the items being selected by the users identified by the values of the user ID field 1011.

Figure 3:
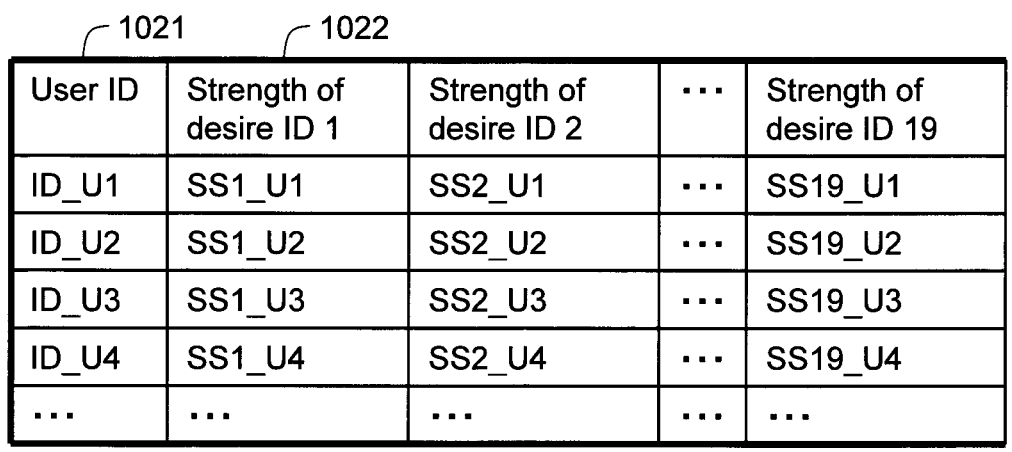
FIG. 3 is a diagram showing an example of configuration of desire profile data stored in a user profile database 102.

FIG. 3 is a diagram showing an example of configuration of desire profile data stored in the user profile database 102. The user profile database 102 is a database describing constant levels of desires of the users. The user profile database 102 includes a user ID field 1021 and a desire strength field 1022.

The user ID field 1021 holds identifiers for uniquely identifying the users. The desire strength field 1022 holds values indicating desire degrees that are constant (hereinafter, "constant desire degrees"), the constant desire degrees indicating levels of basic desires of the users on a daily basis. If there are a plurality of types of desires, a plurality of desire strength fields 1022 may be arranged. The present first embodiment includes 19 types.

For example, the user can answer a questionnaire, such as a psychological test, upon the subscription of the service to generate the constant desire strengths of the user. The user may set the strengths. The constant desire degrees vary depending on the season. Therefore, the constant desire degrees may be registered for each season. The constant desire degrees may be learned and estimated as described later.

FIGS. 4A and 4B are diagrams showing examples of configuration of data stored in the context-desire combination probability database 105. FIG. 4A is a table describing whether the desire of the user is satisfied under a certain context, for each combination of the desire and the context. FIG. 4B is a table describing detailed content of the contexts.

The table shown in FIG. 4A includes a context ID field 1051 and a desire satisfiability field 1052. The context ID field 1051 holds identifiers for uniquely identifying the contexts. The desire satisfiability field 1052 holds values describing the probabilities of satisfying the desires under the contexts identified by the values of the context ID field 1051, for each desire type. The user may set in advance the probabilities of satisfying the desires, or the probabilities may be learned and estimated from the action history of the user as described later.

The table shown in FIG. 4B includes the context ID field 1051, a detail field 1053, and a determination condition field 1054. The detail field 1053 describes content of the contexts. The determination condition field 1504 describes conditions for determining to which one of the contexts the current situation of the user corresponds.

Figure 5A:
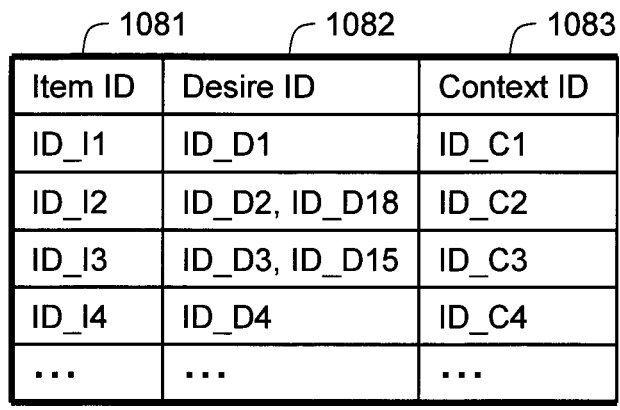
FIGS. 5A and 5B are diagrams showing examples of configuration of data stored in a context-desire database 108.
Figure 5B:
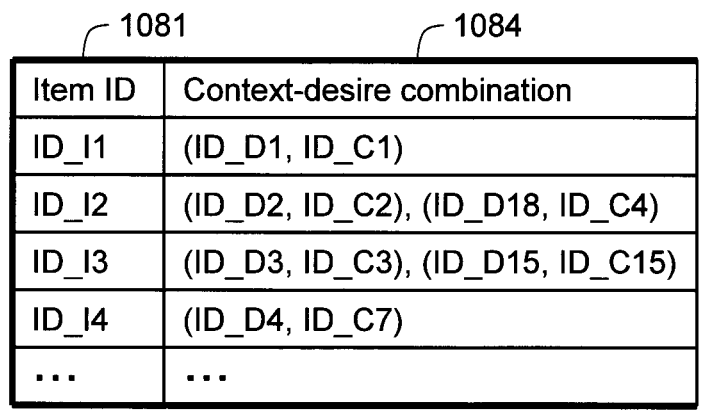

FIGS. 5A and 5B are diagrams showing examples of configuration of data stored in the context-desire database 108. FIG. 5A is a table describing desires that can be satisfied by selecting items under a certain context. More specifically, the table holds combinations of the item, the desire, and the context. FIG. 5B is a simplified table of the table shown in FIG. 5A.

The table shown in FIG. 5A includes an item ID field 1081, a desire ID field 1082, and a context ID field 1083. The item ID field 1081 holds identifiers for uniquely identifying the items. The desire ID field 1082 holds values indicating types of the basic desires satisfied by selecting the items identified by the values of the item ID field 1081. The context ID field 1083 holds identifiers of the contexts suitable for selecting the items identified by the values of the item ID field 1081. For example, the user may set the basic desires satisfied by selecting the items and the types of the contexts suitable for the item selection, or the basic desires and the types may be learned and estimated.

The table shown in FIG. 5B includes a context-desire combination field 1084 in place of the desire ID field 1082 and the context ID field 1083. Although the content described in the fields is the same, two fields are consolidated into one in the table shown in FIG. 5B.

Figure 6:
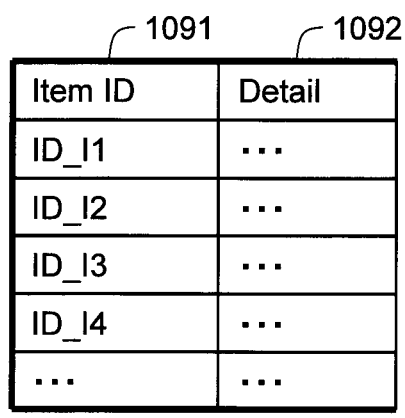
FIG. 6 is a diagram showing an example of configuration of data stored in an item database 109.

FIG. 6 is a diagram showing an example of configuration of data stored in the item database 109. The item database 109 includes an item ID field 1091 and a detail field 1092.

The item ID field 1091 holds identifiers for uniquely identifying the items. The detail field 1092 describes details of the content of the items.

The configuration of the information providing system 100 has been described. An operation of the information providing system 100 will be described.

Figure 7:
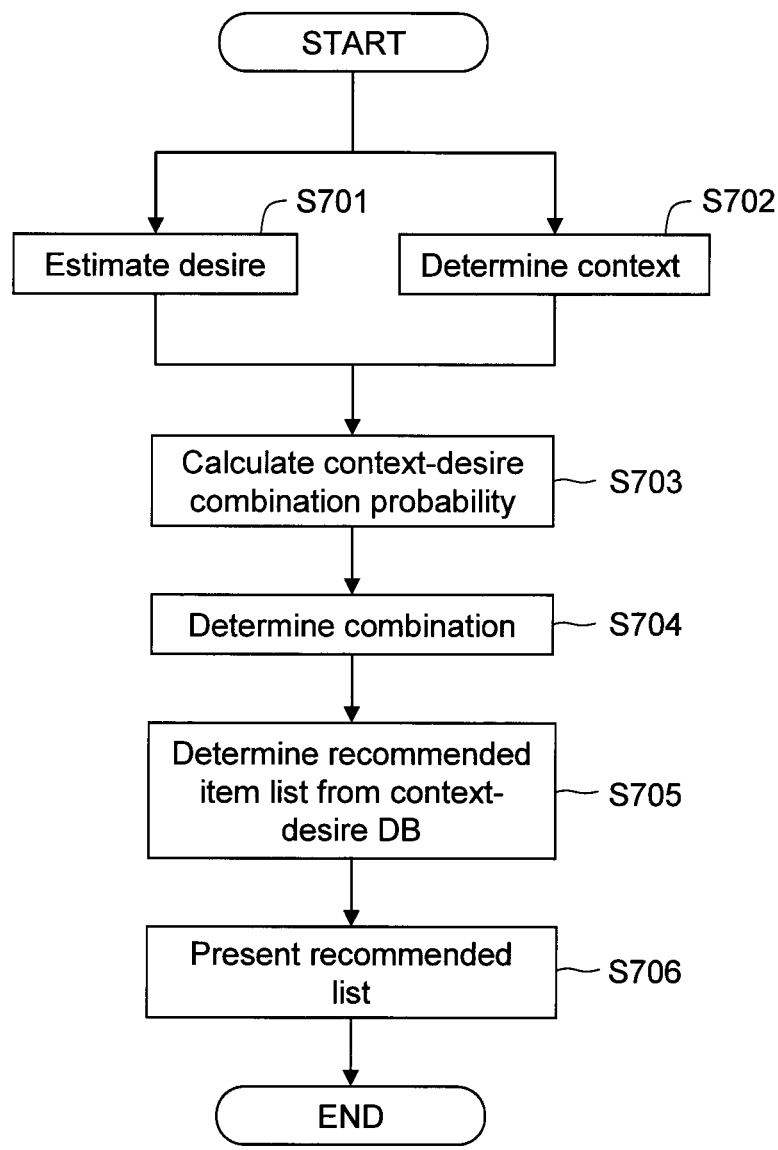
FIG. 7 is a flow chart showing an operation of the information providing system 100.

FIG. 7 is a flow chart showing an operation of the information providing system 100. The steps of FIG. 7 will be described.

(FIG. 7: Step S701)

The desire estimation unit 103 estimates the strength of the current desire of the user based on the information that is stored in the user action history database 101 and that is related to the basic desires satisfied by selecting the items and based on the constant strengths of the desires of the user stored in the user profile database 102. The method of estimating the strength of the desire will be supplemented below.
(FIG. 7: Step S701: Supplement 1)

The desire estimation unit 103 calculates a desire satisfaction degree obtained by selecting the item based on the data stored in the user action history database 101. The satisfaction degree of the desire is a rate indicating what kind of basic desire of the target user is satisfied and what kind of basic desire is not satisfied at this moment, for each basic desire. For example, the following Expression 1 can be used to calculate the desire satisfaction degree.

$$S_n = \frac{COST_n}{COST_{total}} \qquad \text{(Expression 1)}$$

In Expression 1, "n" denotes the desire ID. "$S_n$" denotes the desire satisfaction degree of the desire $ID_n$. "$COST_{total}$" denotes the total number of actions of the user. "$Cost_n$" denotes the number of times the user actions have satisfied the desire $ID_n$. In a case of a TV program, "$COST_n$" may be calculated based on the length or view time of the program, instead of the number of times. In a case of a commodity other than the TV program, "$COST_n$" may be calculated based on the price, etc. When the calculation is based on the price, "$COST_{total}$" can be the total cost spent by the user, and "$COST_n$" can be the cost spent for the desire $ID_n$.
(FIG. 7: Step S701: Supplement 2)

The desire satisfaction degree can be calculated from, for example, the action history of past one week in accordance with the values of the date/time field 1014. In this case, the user action history database 101 may store only the action history within a period necessary to calculate the desire satisfaction degree.
(FIG. 7: Step S701: Supplement 3)

The desire estimation unit 103 calculates the current strengths of all basic desires of the user based on the desire satisfaction degrees and the constant desire strengths of the user stored in the user profile database 102. In this way, basic desires strongly desired by the user at this moment can be extracted. The following Expression 2 can be used to calculate the current strengths of the basic desires of the user.

$$Q_n = 1 - \frac{S_n}{SS_n} \quad (S_n \leq SS_n) \qquad \text{(Expression 2)}$$
$$Q_n = 0 \qquad (S_n > SS_n)$$

"$Q_n$" denotes a rate indicating the current strength of the desire $ID_n$ and is a value between 0 and 1. "$S_n$" denotes the desire satisfaction degree of the desire $ID_n$ and is calculated by Expression 1. "$SS_n$" denotes a rate indicating the constant satisfaction degree of the desire $ID_n$ and is a value between 0 and 1. If the desire satisfaction degree "$S_n$" is reaching the constant desire degree "$SS_n$", the desire is sufficiently satisfied at this moment, and "$Q_n$" is 0. A formula other than Expression 2 may be used if the formula can express the strengths of the basic desires.
(FIG. 7: Step S702)

In parallel with step S701, the context determination unit 104 determines the current context of the user. For example, the context determination unit 104 can measure the physical environment, such as surrounding temperature and date/time, around the information providing system 100 to determine the context based on determination conditions set in advance as described in FIG. 4B. One or a plurality of contexts can be determined. The user may input the context to the information providing system 100.
(FIG. 7: Step S703)

The combination calculation unit 106 uses the current strength of the basic desire of the user and the current context of the user to refer to the information stored in the context-desire combination probability database 105 to acquire a combination of the desire and the context that the item needs to satisfy. The combination calculation unit 106 further determines a priority of the combination of the desire and the context that the item needs to satisfy based on the probability described in the database. For example, the following Expression 3 can be used to calculate the priority.

$$\text{Priority(desire,Context)} = \alpha \times Q_{desire} + (1-\alpha) \times Pr(\text{desire}|\text{Context}) \quad \text{(Expression 3)}$$

In Expression 3, "desire" denotes the type of the basic desire. "Context" denotes the context of the user. "Priority (desire,Context)" denotes the priority of the combination of the basic desire "desire" and the context "Context" that can be satisfied by the item. "$Q_{desire}$" denotes the strength of the current basic desire "desire" calculated by Expression 2. "Pr(desire|Context)" denotes the probability that the item can satisfy both the context "Context" and the basic desire "desire", and "Pr(desire|Context)" can be acquired from the context-desire combination probability database 105. In Expression 3, "$\alpha$" denotes a parameter for setting which one of the strength of the current desire of the user and the probability of the combination of the context and the desire will be emphasized. If "$\alpha$" is 1, only the strength of the current desire will be used, and if "$\alpha$" is 0, only the probability of the combination of the context and the desire will be used.
(FIG. 7: Step S703: Supplement)

The user may set the value of "$\alpha$" in advance, or the usage situation of the information providing system 100 may be learned to dynamically change the value of "$\alpha$". A formula other than Expression 3 may be used if the formula can express the priority related to the combination of the basic desire and the context. One or a plurality of combinations of the context and the desire that can be satisfied by the item may be set.
(FIG. 7: Step S704)

The combination calculation unit 106 determines an optimal combination of the item, the desire, and the context according to the priority calculated in step S703. If the priority is low, the combination is not suitable for satisfying the desire and the context, or the priority is lowered by the setting of the factor "$\alpha$". Only a combination with the priority equal to or greater than a predetermined value may be extracted in the present step. Alternatively, since both the desire of the user and the context of the user need to be satisfied, only a combination with the value of "Pr(desire|Context)" equal to or greater than a predetermined value may be extracted.
(FIG. 7: Step S705)

The optimal item search unit 107 searches a record corresponding to the combination determined by the combination calculation unit 106 in step S704, from the context-desire database 108. If a plurality of combinations are obtained, priorities may be provided to the obtained records according to the priorities calculated by the combination calculation unit 106 in step S703.
(FIG. 7: Steps S704 and S705: Supplement)

The combination of the item, the desire, and the context is stored in the context-desire database 108. Therefore, only the database may be used to specify the combination. However, how much the combination of the item, the desire, and the context satisfies the desire and the context cannot be accurately figured out only from the database, and just a parallel presentation of all combinations is possible. Therefore, it is desirable to use the records stored in the context-desire combination probability database 105 to use a combination that can more surely satisfy the desire of the user and the context of the user.
(FIG. 7: Step S706)

The optimal item search unit 107 presents the user with the result of step S705. An optimal output format, such as screen display and data output, can be used as necessary in accordance with an output apparatus included in the information providing system 100.

First Embodiment

Summary

In this way, the information providing system 100 according to the present first embodiment estimates the current strength of the desire of the user and the current situation of the user to specify the combination of the item, the desire, and the context that can satisfy the desire and the situation. As a result, an item that satisfies both the desire of the user and the context of the user can be presented.

The information providing system 100 according to the present first embodiment calculates the probability of satisfying both the desire of the user and the context of the user based on the information stored in the context-desire combination probability database 105 and presents an optimal item according to the probability. As a result, an item that can more surely satisfy the combination of the desire and the context can be presented to the user.

The information providing system 100 according to the present first embodiment calculates the priority defining which one of "$Q_{desire}$" and "Pr(desire|Context)" will be prioritized according to Expression 3 and uses the priority to search an item. As a result, an item to be presented can be adjusted.

In the present first embodiment, items corresponding to the most likely combination may be selected and presented to the user, or items satisfying combinations satisfying the combination probability of equal to or more than a predetermined value may be collectively presented to the user.

In the present first embodiment, an action history extracted from only the same domain, such as purchase of books and CDs as well as viewing of programs, may be used, or an action history may be extracted from different domains. When the action history of different domains is used, if the strongest basic desire calculated by the desire estimation unit 103 is "intellectual curiosity", commodities belonging to different domains, such as "educational program", "quiz program", "trivia book", and "planetarium", can be recommended as items satisfying the desire. Meanwhile, if the context of the user is "dating", "planetarium" can be presented based on the likelihood of the context-desire combination. If the context of the user is "at home", "educational program" and "quiz program" can be presented.

In the present first embodiment, there can be a case in which although "steak restaurant" satisfies a combination of the context "at dinner" and the desire "intake/consume", data indicating that "steak restaurant" does not satisfy the combination of the context "at dinner" and the desire "intake/consume" is stored in the context-desire combination probability database 105 or the context-desire database 108. According to the present first embodiment, an item suitable for the context of the user can be presented for the same desire.

Second Embodiment

A second embodiment of the present invention describes an example of configuration, in which the action history stored in the user action history database 101 is used to calculate the probability of the combination of the context and the desire to thereby take into account the personality of the user that changes over time.

Figure 8:
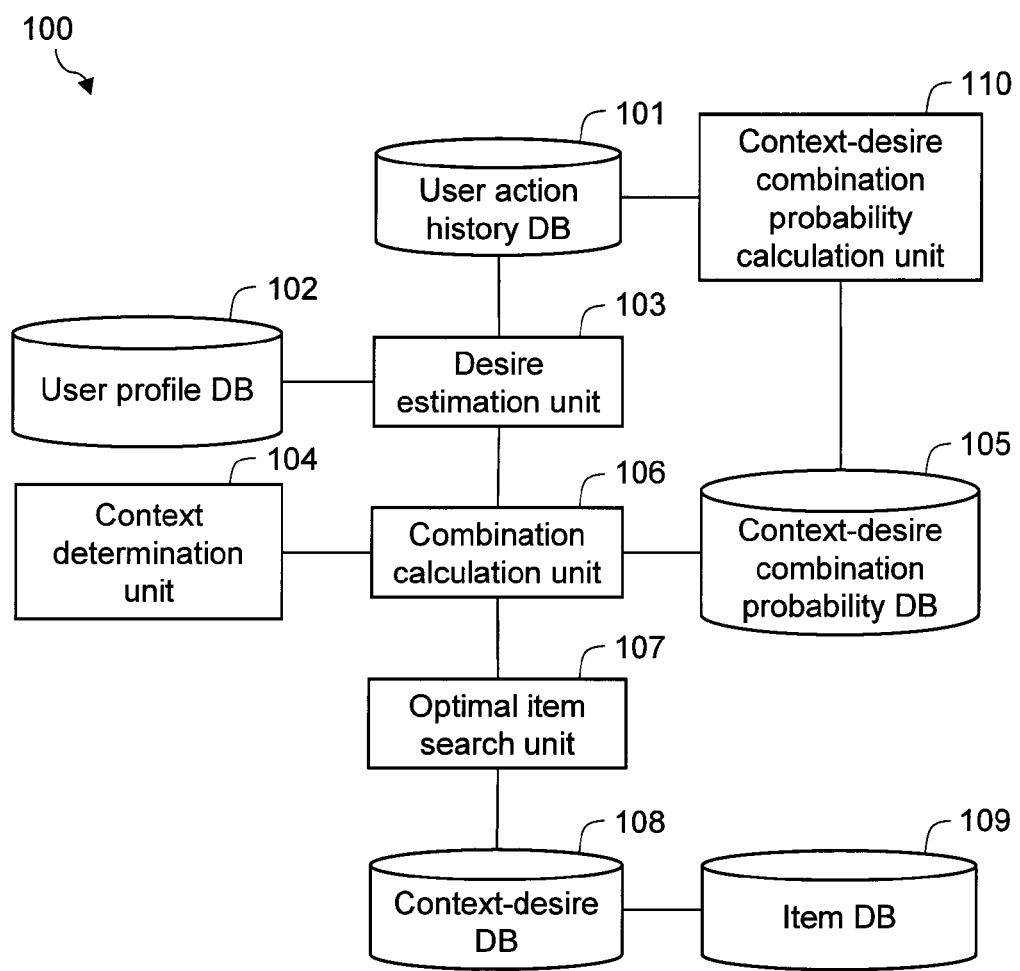
FIG. 8 is a functional block diagram of the information providing system 100 according to a second embodiment.

FIG. 8 is a functional block diagram of the information providing system 100 according to the present second embodiment. In addition to the configuration described in the first embodiment, the information providing system 100 according to the present second embodiment includes a context-desire combination probability calculation unit 110. The other configurations are the same as in the first embodiment, and differences will be mainly described.

The context-desire combination probability calculation unit 110 uses the action history stored in the user action history database 101 to calculate the probability of the combination of the context and the desire and stores the probability in the context-desire combination probability database 105.

Figure 9:
FIG. 9 is a diagram showing an example of configuration of data stored in the user action history database 101 according to the second embodiment.

FIG. 9 is a diagram showing an example of configuration of data stored in the user action history database 101 according to the present second embodiment. Although the user ID field 1011 is omitted here, the field may be arranged as in the first embodiment if the action histories of a plurality of users are stored.

In the present second embodiment, the user action history database 101 includes a context ID field 1015 in addition to the configuration described in the first embodiment. The context ID field 1015 holds identifiers of the contexts of the user when the user selects the items identified by the values of the item ID field 1012.

The configuration of the information providing system 100 according to the present second embodiment has been described. An operation of the information providing system 100 according to the present second embodiment will be described.

The context-desire combination probability calculation unit 110 calculates the probability of appearance of each combination of the context and the desire in the action history stored in the user action history database 101 and stores the probabilities in the context-desire combination probability database 105. For example, the following Expression 4 can be used to calculate the probability of appearance of the combination of the context and the desire.

$$\Pr(\text{desire} \mid \text{Context}) = \frac{N_{\text{desire} \cap \text{Context}}}{N_{\text{deisre}} + N_{\text{Context}}} \quad \text{(Expression 4)}$$

"$N_{\text{desire} \cap \text{Context}}$" denotes the number of appearances of the action history that simultaneously satisfies the desire "desire" and the context "Context" in the user action history database 101. "$N_{\text{desire}}$" denotes the number of appearances of the action history that satisfies the desire "desire" in the user action history database 101. "$N_{\text{Context}}$" denotes the number of appearances of the action history that satisfies the context "Context" in the user action history database 101. A formula other than Expression 4 can also be used if the formula expresses the likelihood of the combination of the context and the desire.

Second Embodiment

Summary

In this way, the information providing system 100 according to the present second embodiment uses the action history stored in the user action history database 101 to calculate "Pr(desire|Context)". As a result, the temporal change in the user action can be followed, and an item suitable for the desire of the user and the context of the user can be presented.

Third Embodiment

A third embodiment of the present invention describes a method of providing an index to the database 101 according to the frequency of use of the item by the user to speed up the data access. The configuration of the information providing system 100 is the same as in the first and second embodiments, and differences related to the index will be mainly described.

The combination calculation unit 106 adds an index to the context-desire combination probability database 105 according to the frequency of appearance of the context that appears in the user action history database 101. For example, the index is provided to about highest ten combinations of the frequency of appearance of the context.

The optimal item search unit 107 calculates the number of appearances of each combination of the context and the desire that appears in the user action history database 101 and adds the index to the context-desire database 108 according to the number of appearances. For example, the index is added to about highest ten combinations of the frequency of appearance. Alternatively, the index may be added according to the number of appearances of the desire.

The index allows quick search of the probability of the context-desire combination corresponding to the context with high frequency. For example, a context and a desire that are often generated in the current season are expected to be frequently searched. Therefore, the index can be provided to the context and the desire to quickly obtain the search result.

Third Embodiment

Summary

In this way, the information providing system 100 according to the present third embodiment adds the index to the user action history database 101 according to the frequency of appearance of the context and adds the index to the context-desire database 108 according to the frequency of appearance of the combination of the context and the desire. As a result, the process of the information providing system 100 can be speeded up, and real-time presentation of information can be secured.

The number of records for adding the index may not be top 10 records in the present third embodiment, and the user may set the number in advance. In the calculation of the number of appearances, the target period may be limited, such as records of past one month, instead of using all records stored in the user action history database 101.

Fourth Embodiment

A fourth embodiment of the present invention describes an example of configuration, in which the context when the user selects the item is taken into account to estimate the internal state of the user to present the user with more effective information.

Figure 10:
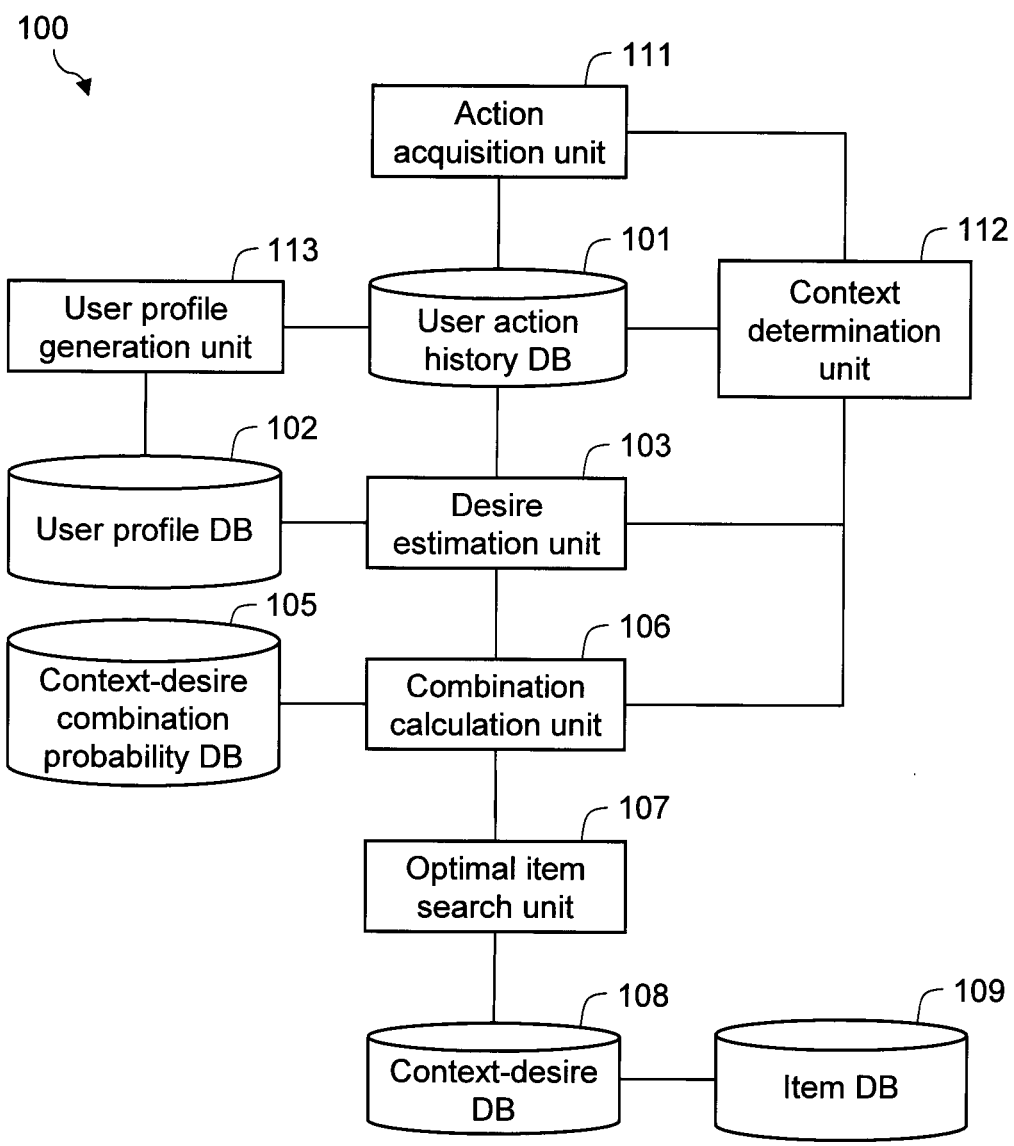
FIG. 10 is a functional block diagram of the information providing system 100 according to a fourth embodiment.

FIG. 10 is a functional block diagram of the information providing system 100 according to the present fourth embodiment. In addition to the configurations described in the first to third embodiments, the information providing system 100 according to the present fourth embodiment includes an action acquisition unit 111, a context determination unit 112, and a user profile generation unit 113. Although an example of adding the function units to the configuration described in the first embodiment is illustrated here, the function units can also be added to the configurations described in the other embodiments.

When the user carries out an action, such as selection of an item, the action acquisition unit 111 acquires the information of the action and stores the information in the user action history database 101. The context determination unit 112 determines the current context of the user. The user profile generation unit 113 uses the action history stored in the user action history database 101 to calculate the constant strength of the basic desire of the user and stores the strength in the user profile database 102.

Figure 11A:
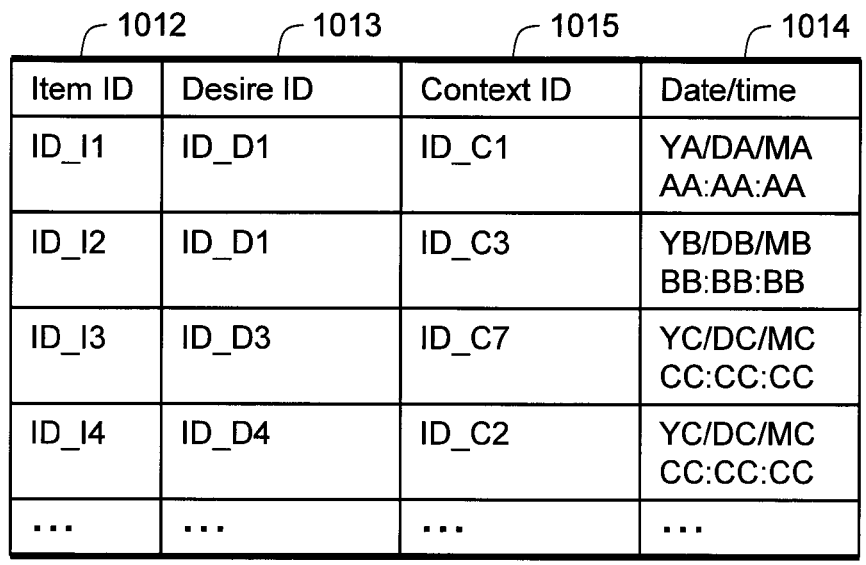
FIGS. 11A and 11B are diagrams showing an example of configuration of data stored in the user action history database 101 according to the fourth embodiment.
Figure 11B:
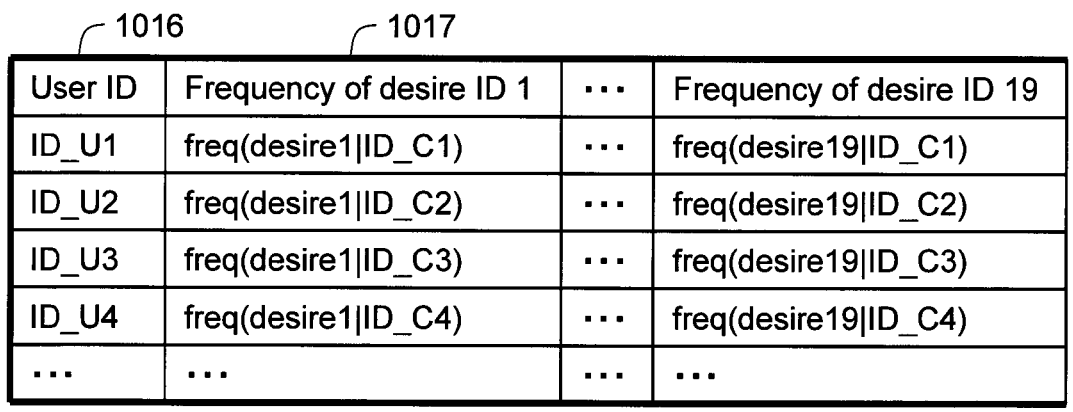

FIGS. 11A and 11B are diagrams showing examples of configuration of data stored in the user action history database 101 according to the present fourth embodiment. FIG. 11A is a diagram showing a configuration of a table holding the action history of the user. FIG. 11B is a table holding frequencies of satisfying the basic desires of each user under a certain context.

The table shown in FIG. 11A has the same configuration as the configuration described in FIG. 9.

The table shown in FIG. 11B includes a user ID field 1016 and a desire frequency field 1017. The user ID field 1016 holds identifiers for uniquely identifying the users. The desire frequency field 1017 holds rates indicating the frequencies of satisfying the basic desires of the users under a certain context. The desire estimation unit 103 can use, for example, the following Expression 5 to calculate the frequency of satisfying the desire $ID_n$.

$$freq(n \mid \text{Context}) = \frac{COST_{n\text{Context}}}{\sum_{n} COST_{n \cap \text{Context}}} \quad \text{(Expression 5)}$$

"$Cost_{n \cap Context}$" denotes the number of times the desire of the desire $ID_n$ and the context "Context" are satisfied at the same time in the records stored in the user action history database 101. A formula other than Expression 5 can also be used if the formula expresses the frequency of satisfying the desire under a certain context.

Whether the desire is satisfied under a certain context obviously varies depending on the context, but may also vary depending on the user. Therefore, the frequencies of satisfying the desires under certain contexts are stored as the action history of each user in the present fourth embodiment, and the frequencies are used to present the items.

Figure 12:
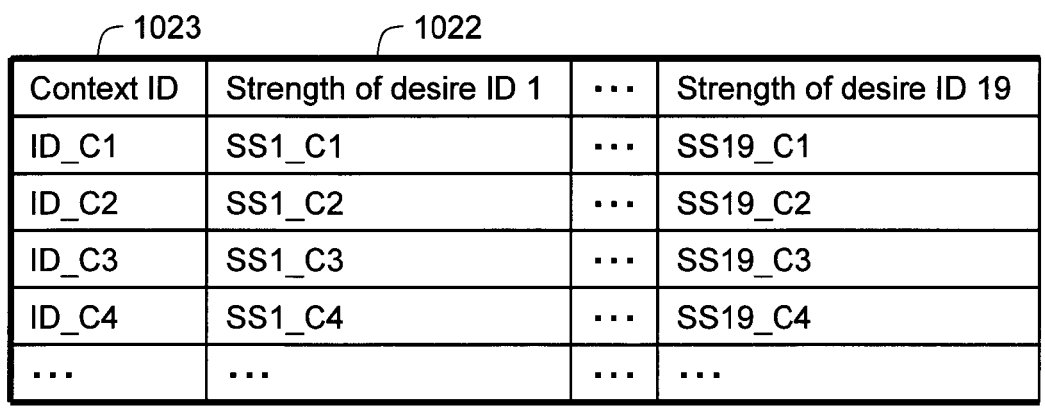
FIG. 12 is a diagram showing an example of configuration of data stored in the user profile database 102 according to the fourth embodiment.

FIG. 12 is a diagram showing an example of configuration of data stored in the user profile database 102 according to the present fourth embodiment. The user profile database 102 includes the desire strength field 1022 and a context ID 1023. Although the user ID field 1021 is omitted, the field is also necessary if the constant strengths of the desires of a plurality of users are held. In the present fourth embodiment, the user profile database 102 describes the constant strengths of the desires of the user for each context.

The user profile generation unit 113 uses the correspondence between the context and the desire satisfaction frequency stored in the user action history database 101 to calculate the constant strengths of the desires of the user under a certain context according to the following Expression 6 and stores the strengths in the user profile database 102.

$$SS_n(\text{Context}) = \frac{COST_n}{freq(n \mid \text{Context}) \times COST_{total}} \quad \text{(Expression 6)}$$

"$SS_n(\text{Context})$" denotes the constant strength of the desire $ID_n$ under the context "Context". "$COST_{total}$" denotes the total number of actions. "$COST_n$" denotes the number of actions that have satisfied the desire of the desire $ID_n$. As in Expression 1, "$Cost_n$" may be calculated based on the length or view time of the program in the case of a TV program, instead of the number of actions. In the case of a commodity other than the TV program, "$COST_n$" may be calculated based on the price, etc. When "$COST_n$" is based on the price, "$COST_{total}$" can be the total cost spent by the user, and "$COST_n$" can be the cost spent for the desire $I_n$.

The desire estimation unit 103 calculates the current satisfaction degrees of the desires of the user based on Expression 1 and uses the degrees to calculate the current strengths of the desires under each context. For example, the following Expression 7 can be used for the calculation.

$$Q_n = 1 - \frac{S_n}{SS_n(\text{Context})} \quad (S_n \leq SS_n(\text{Context})) \quad \text{(Expression 7)}$$
$$Q_n = 0 \quad (S_n > SS_n(\text{Context}))$$

"$Q_n$" denotes the rate indicating the current strength of the desire $ID_n$ and is a value between 0 and 1. "$S_n$" denotes the desire satisfaction degree of the desire $ID_n$. "$SS_n$" denotes the rate indicating the constant desire degree of the desire $ID_n$ and is a value between 0 and 1. If the desire satisfaction degree "$S_n$" is reaching the rate of the constant desire degree "$SS_n$", the desire is sufficiently satisfied at this moment, and "$Q_n$" is 0. A formula other than Expression 7 may be used if the strengths of the basic desires can be expressed.

Fourth Embodiment

Summary

In this way, the information providing system 100 according to the present fourth embodiment obtains the constant strengths of the basic desires of the user under a certain context, and the items are presented according to the strengths. Although the constant desires of the user are constant regardless of the context in the first to third embodiments, appropriate items can be presented to the user with different basic desires in each context in the present fourth embodiment.

For example, the desire related to "intake/consume" concerning appetite is weak when the context of the user is "summer", but the desire related to "intake/consume" is strong when the context is "fall". According to the present fourth embodiment, appropriate items according to the context can be presented to the user with the desire strength that varies according to the context.

In the present fourth embodiment, the user action history database 101 and the user profile database 102 may store only the records related to the context that continues for a certain period. For example, the context, such as a season and a vacation, continues for more than several days. The databases may hold only the calculation results related to the continuous context. The index may be added to the databases according to the frequency of appearance and the continuation time of the context.

Fifth Embodiment

A fifth embodiment of the present invention describes an example of configuration of collectively managing the action histories of a plurality of users to present appropriate items to a user with few item selection records, such as a newly added user.

Figure 13:
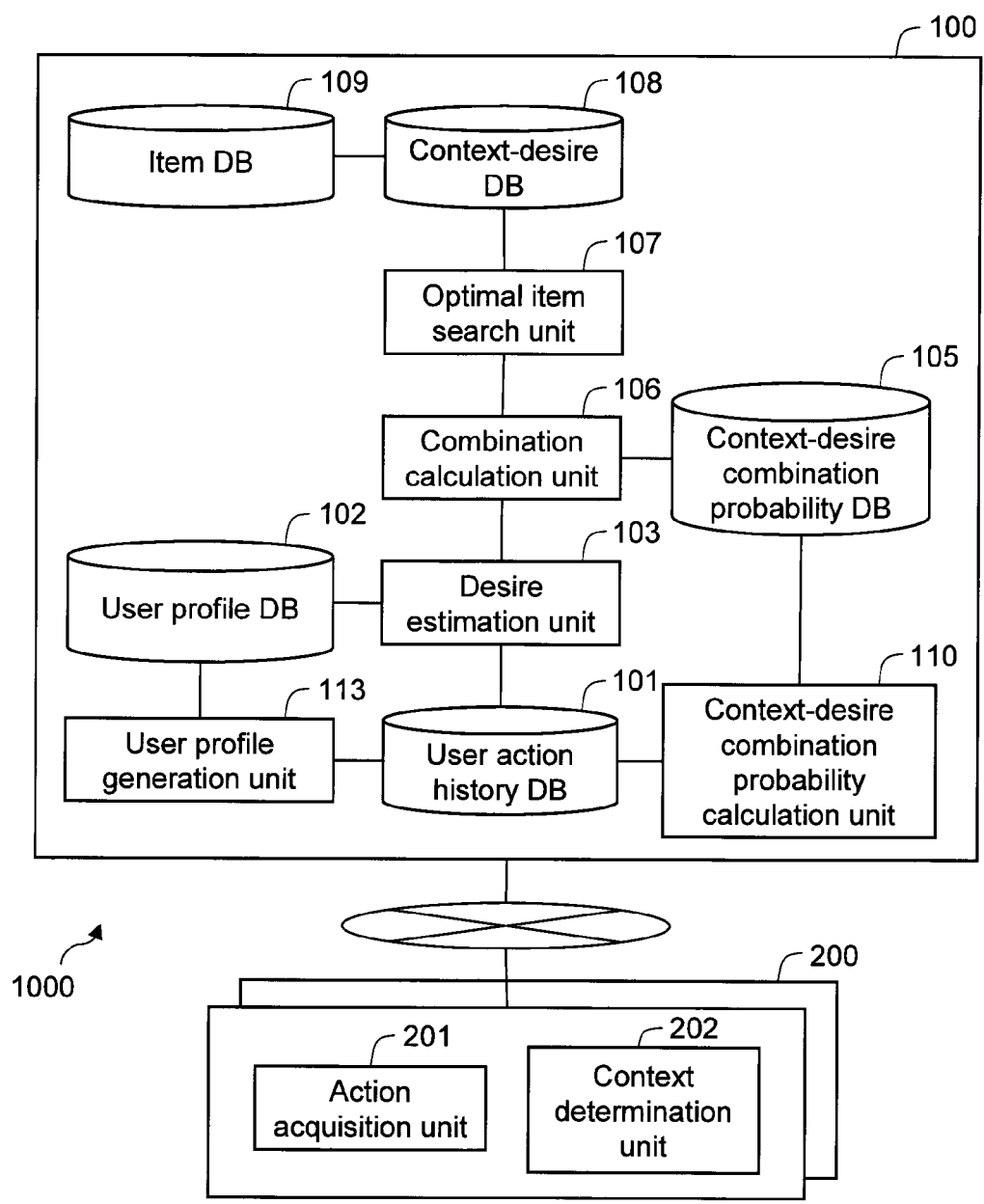
FIG. 13 is a configuration diagram of an information presentation system 1000 according to a fifth embodiment.

FIG. 13 is a configuration diagram of an information presentation system 1000 according to the present fifth embodiment. The information presentation system 1000 includes the information providing system 100 and a user terminal 200.

In the present fifth embodiment, the context-desire combination probability calculation unit 110 uses the action histories of a plurality of users to calculate the combination probabilities of the context and the desire and stores the probabilities in the context-desire combination probability database 105. The user profile generation unit 113 uses the action histories of a plurality of users to calculate the constant strengths of the basic desires of the users and stores the strengths in the user profile database 102. The other configurations are the same as in the first to fourth embodiments.

The user terminal 200 is a terminal used by the user to select an item such as a commodity, and the user terminal 200 includes an action acquisition unit 201 and a context determination unit 202. The action acquisition unit 201 acquires an action of the user and transmits the action to the information providing system 100. The context determination unit 202 determines the current context of the user. In the present fifth embodiment, the user directly operates the user terminal 200 instead of the information providing system 100. Therefore, the user terminal 200 includes the function units that acquire the user operation and the situation (context) of the user.

The configuration of the information presentation system 1000 has been described. An operation of the information presentation system 1000 will be described.

The context-desire combination probability calculation unit 110 calculates the probability of appearance of each combination of the context and the desire in the item selection histories of all users stored in the user action history database 101 and stores the probabilities in the context-desire combination probability database 105. For example, the following Expression 8 can be used to calculate the probability of appearance of the combination of the context and the desire.

$$\Pr(\text{desire} | \text{Context}) = \frac{\sum_{user} N_{desire \cap Context}(\text{user})}{\sum_{user} N_{desire}(\text{user}) + N_{Context}(\text{user})} \quad \text{(Expression 8)}$$

In Expression 8, "user" denotes the user. "$N_{desire \cap Context}$(user)" denotes the number of times the desire "desire" and the context "Context" in the action history stored in the user action history database 101 are satisfied at the same time. "$N_{desire}$(user)" denotes the number of times the desire "desire" is satisfied. "$N_{context}$(user)" denotes the number of times the context "Context" is satisfied. A formula other than Expression 8 can also be used if the formula expresses the likelihood of the combination of the context and the desire.

The user profile generation unit 113 clusters all users to classify the users into some patterns and calculates the likelihood of the combinations of the context and the desire for each pattern. Examples of the clustering method include conventional methods such as hierarchical clustering and k-means. An overlap may be permitted in the clusters.

The user profile generation unit 113 calculates similarity between the users to cluster the users into some groups. The user may set the number of groups in advance. The similarity between the users may be calculated based on, for example, the item selected by the user as in the following Expression 9. The user profile may be used to calculate the similarity as in the following Expression 10, or another formula indicating the similarity between the users may be used to calculate the similarity.

$$d(U_n, U_m) = Ove(U_n, U_m) \quad \text{(Expression 9)}$$

"$U_n$" denotes a user with a user ID n, and "$d(U_n, U_m)$" denotes similarity between users $U_n$ and $U_m$. "$Ove(U_n, U_m)$" denotes the number of items used by both the users $U_n$ and $U_m$.

$$d(U_n, U_m) = \frac{1}{\sum_i |U_n(i) - U_m(i)|} \quad \text{(Expression 10)}$$

In Expression 10, "i" denotes the desire ID. "$U_n$" denotes the constant strength of the desire of the user $U_n$ for the desire i.

Figure 14:
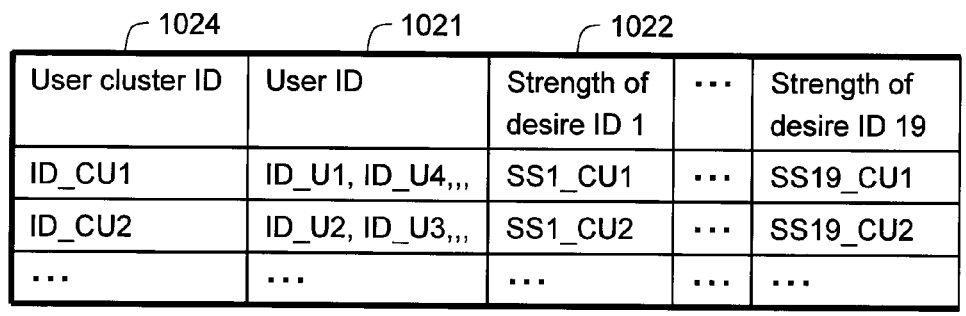
FIG. 14 is a diagram showing an example of configuration of the user profile database 102 according to the fifth embodiment.

FIG. 14 is a diagram showing an example of configuration of the user profile database 102 according to the present fifth embodiment. In the present fifth embodiment, the user profile database 102 includes a user cluster ID field 1024 for holding identifiers of the user clusters. In the present fifth embodiment, the desire profiles can be classified into the user clusters generated by the user profile generation unit 113, and the user profile database 102 can store average desire profiles of the users belonging to the clusters.

A method of calculating the likelihood of the combination of the context and the desire for each user cluster will be described. The context-desire combination probability calculation unit 110 can use, for example, the following Expression 11 to calculate the likelihood of the combination of the context and the desire.

$$\Pr_{CU}(\text{desire} | \text{Context}) = \frac{\sum_{user \in CU} N_{desire \cap Context}(\text{user})}{\sum_{user \in CU} N_{deisre}(\text{user}) + N_{Context}(\text{user})} \quad \text{(Expression 11)}$$

"CU" denotes the clusters obtained as a result of clustering all users, and "user" denotes the users. "$N_{desire \cap Context}$(user)" denotes the number of times of satisfying the desire "desire" and the context "Context" at the same time in the records stored in the user action history database 101. "$N_{desire}$(user)" denotes the number of times of satisfying the desire "desire". "$N_{Context}$(user)" denotes the number of times of satisfying the context "Context". A formula other than Expression 11 can also be used if the formula expresses the likelihood of the combination of the context and the desire.

Figure 15:
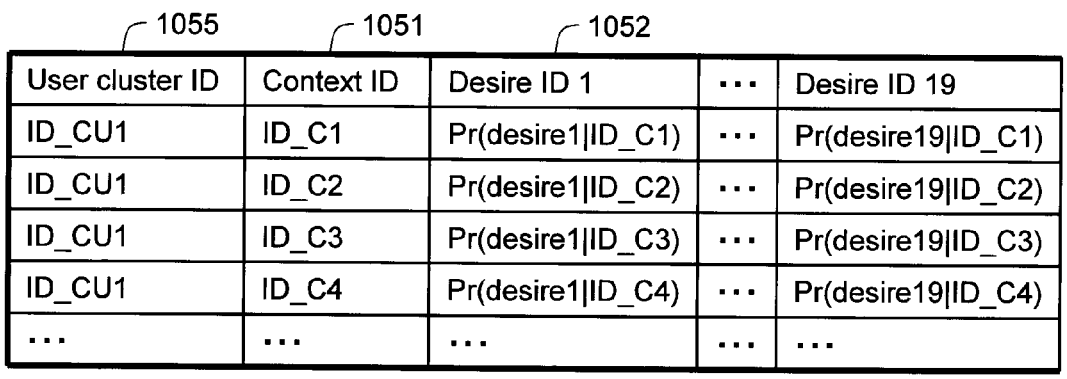
FIG. 15 is a diagram showing an example of configuration of the context-desire combination probability database 105 according to the fifth embodiment.

FIG. 15 is a diagram showing an example of configuration of the context-desire combination probability database 105 according to the present fifth embodiment. In the present fifth embodiment, the context-desire combination probability database 105 includes a user cluster ID field 1055 that holds identifiers of the user clusters. The database stores data describing, for each user cluster, the probabilities of satisfying the basic desires under a certain context.

The combination calculation unit 106 may use the context-desire combination probabilities calculated based on the action history of a plurality of users at an initial stage of the use of the information presentation system 1000 by the user and may use the context-desire combination probabilities calculated based only on the action history of the user at a stage that the action history is accumulated to some extent. The user may set the switch timing in advance, or the user may manually switch the usage of the probabilities when the user is using the information presentation system 1000. The user may evaluate the presented item to switch the usage of the probabilities when the evaluation point is over a predetermined value.

The optimal item search unit 107 may have a function of using the action histories of a plurality of users to update the context-desire database 108. In this case, the optimal item selection unit 107 calculates the frequencies of the combinations of the context and the desire satisfied by the items based on the action histories of all users and registers the combination with the highest frequency in the context-desire database 108. The frequencies of the combinations of the context and the desire satisfied by the items may be calculated for each pattern generated by clustering all users, and the combination with the highest frequency may be registered in the context-desire database 108. For example, a pattern in which an item "sandwich" satisfies the desire "intake/consume" when the context is "at breakfast" and a pattern in which an item "steak" satisfies the desire "intake/consume" when the context is "at breakfast" are handled as patterns with different combinations of the item, the context, and the desire.

When a user newly starts using the information presentation system 1000, the information providing system 100 uses the desire profile corresponding to the user cluster including the new user among the desire profiles generated from the action histories of all registered users or among the desire profiles generated from the user clusters and determines the items to be presented to the new user. The user may designate the desire profile to be used, or a desire profile of the user cluster closest to the attributes of the user, such as address and age, may be used. The desire profile may be determined by other methods. As a result, the items can be presented to the new user without a sufficiently accumulated action history.

Although examples of item information, such as commodity information, TV program information, book information, and sightseeing spot information, have been described in the first to fifth embodiments, it is obvious that the method of the present invention can be applied to a function of presenting item information of various domains.

The present invention is not limited to the embodiments, and various modified examples are included. The embodiments are described in detail to describe the present invention in an easily understood manner, and the embodiments are not necessarily limited to the embodiments that include all configurations described above. Part of the configuration of an embodiment can be replaced by the configuration of another embodiment. The configuration of an embodiment can be added to the configuration of another embodiment. Addition, deletion, and replacement of other configurations are also possible for part of the configurations of the embodiments.

The configurations, the functions, the processing units, the processing means, etc., may be realized by hardware such as by designing part or all of the components by an integrated circuit. A processor may interpret and execute programs for realizing the functions to realize the configurations, the functions, etc., by software. Information, such as programs, tables, and files, for realizing the functions can be stored in a recording device, such as a memory, a hard disk, and an SSD (Solid State Drive), or in a recording medium, such as an IC card, an SD card, and a DVD.

DESCRIPTION OF SYMBOLS

100: information providing system, 101: user action history database, 1011: user ID field, 1012: item ID field, 1013: desire ID field, 1014: date/time field, 1015: context ID field, 1016: user ID field, 1017: desire frequency field, 102: user profile database, 1021: user ID field, 1022: desire strength field, 1023: context ID, 1024: user cluster ID field, 103: desire estimation unit, 104: context determination unit, 105: context-desire combination probability database, 1051: context ID field, 1052: desire satisfiability field, 1053: detail field, 1054: determination condition field, 1055: user cluster ID field, 106: combination calculation unit, 107: optimal item search unit, 108: context-desire database, 1081: item ID field, 1082: desire ID field, 1083: context ID field, 1084: context-desire combination field, 109: item database, 1091: item ID field, 1092: detail field, 110: context-desire combination probability calculation unit, 111: action acquisition unit, 112: context determination unit, 113: user profile generation unit, 200: user terminal, 201: action acquisition unit, 202: context determination unit, 1000: information presentation system

What is claimed is:

1. An information providing system comprising:
    a computer device including a processor, a memory coupled to the processor, and a program stored in the memory, wherein the processor is configured to execute the program and the program includes:
    a user action history database that stores a history of actions of selection of items by a user;
    an item database that stores information indicating features of the items;
    a user profile database that stores desire profiles describing constant strengths of desires of the user, for each type of the desires;
    a context determination unit that acquires external factors when the user selects the items and determines situations of the user based on the external factors;
    a context-desire database that describes a correspondence between the situations of the user, the items, and the desires that can be satisfied by selecting the items under the situations of the user;
    a desire estimation unit that uses the action history of the user stored in the user action history database and the desire profiles of the user stored in the user profile database to estimate the current strength of the desire of the user; and
    an item search unit that uses the current strength of the desire of the user and the current situation of the user to refer to the context-desire database to specify the item suitable for the current strength of the desire of the user and suitable for the current situation of the user and that searches the item from the item database.

2. The information providing system according to claim 1, wherein the program further includes:

a context-desire combination probability database describing probabilities of satisfying the desires of the user under the situations, for each of the situations, wherein the item search unit specifies a combination of the situation and the desire that can satisfy the desire of the user under the situation according to the probabilities described in the context-desire combination probability database and searches the item from the item database according to the result.

3. The information providing system according to claim 2, wherein the item search unit
uses a predetermined formula to calculate a priority indicating prioritization of one of the current strength of the desire of the user and the probability of satisfying the desire of the user under the situation and searches the item according to the priority.

4. The information providing system according to claim 2, wherein the program further includes:

a context-desire combination probability calculation unit that uses the action history of the user stored in the user action history database to calculate likelihood of a combination of the situation, which is a situation of the user when the user selects the item, and the satisfied desire, wherein
the context-desire combination probability database stores the probability calculated by the context-desire combination probability calculation unit.

5. The information providing system according to claim 2, wherein the item search unit
calculates frequency of the situation appearing in the action history of the user and adds an index to a record corresponding to the situation with the frequency of appearance equal to or greater than a predetermined value among the records stored in the context-desire combination probability database.

6. The information providing system according to claim 1, wherein the user action history database
stores the situation when the user selects the item in association with the history, and
the item search unit
calculates the frequency of appearance of the combination of the situation and the desire appearing in the action history of the user and adds an index to a record corresponding to the combination of the situation and the desire with the frequency of appearance equal to or greater than a predetermined value among the records stored in the context-desire database.

7. The information providing system according to claim 1, wherein the user action history database
stores the situation when the user selects the item in association with the history, and
the desire estimation unit
estimates the current strength of the desire of the user under the situation.

8. The information providing system according to claim 7, wherein the program further includes:

a user profile generation unit that uses the action history stored in the user action history database to calculate the constant strength of the desire of the user under the situation and that stores the strength in the user profile database as the desire profile, wherein
the desire profile
describes the constant strength of the desire of the user, for each of the situations, and
the desire estimation unit
estimates the current strength of the desire of the user under the situation according to the description of the desire profile.

9. The information providing system according to claim 1, wherein the user action history database stores only the action history of the user generated under the situation that continues for equal to or more than a predetermined period.

10. The information providing system according to claim 1, wherein the user profile database stores only the constant strength of the desire of the user under the situation that continues for equal to or more than a predetermined period.

11. The information providing system according to claim 1, wherein the user action history database stores the action histories of a plurality of users, and
the user profile database stores a data aggregation of the constant strengths of the desires of the plurality of users.

12. The information providing system according to claim 11, wherein the program further includes:

a user profile generation unit that uses the action history stored in the user action history database to calculate the constant strength of the desire of the user under the situation and that stores the strength in the user profile database as the desire profile, wherein
the user profile generation unit
clusters the users according to similarity between the action histories of the plurality of users or according to similarity between the desire profiles of the plurality of users and stores the result in the user profile database.

13. The information providing system according to claim 12, wherein the user profile generation unit
determines to which one of user clusters obtained by the clustering a new user belongs and
allocates the desire profile corresponding to the user cluster to the new user, and
the item search unit
uses the desire profile allocated to the new user by the user profile generation unit to search an item suitable for the new user.

14. The information providing system according to claim 11, wherein the program further includes:

a context-desire combination probability calculation unit that uses the action histories of the plurality of users stored in the user action history database to calculate likelihood of combinations of the situations, which are situations of the users when the users select the items, and the satisfied desires, wherein
the context-desire combination probability database stores the probabilities calculated by the context-desire combination probability calculation unit.

15. The information providing system according to claim 12, wherein the item search unit
calculates frequency of combinations of the desire and the situation satisfied by the items, for each user cluster obtained by the clustering, and stores the combination with the highest frequency in the context-desire database.

* * * * *